(12) United States Patent
Takhalova

(10) Patent No.: US 10,472,143 B2
(45) Date of Patent: Nov. 12, 2019

(54) CUTTING BOARD AND CONTAINER

(71) Applicant: Irina Takhalova, Rego Park, NY (US)

(72) Inventor: Irina Takhalova, Rego Park, NY (US)

(73) Assignee: ITAK CONCEPTS LLC, Rego Park, NY (US)

( * ) Notice: Subject to any disclaimer, the term of this patent is extended or adjusted under 35 U.S.C. 154(b) by 0 days.

(21) Appl. No.: 15/725,955

(22) Filed: Oct. 5, 2017

(65) Prior Publication Data

US 2018/0093804 A1  Apr. 5, 2018

Related U.S. Application Data

(60) Provisional application No. 62/404,700, filed on Oct. 5, 2016.

(51) Int. Cl.
*A47J 47/08* (2006.01)
*B65D 51/28* (2006.01)
*A47J 47/00* (2006.01)

(52) U.S. Cl.
CPC ........ *B65D 51/2878* (2013.01); *A47J 47/005* (2013.01); *A47J 47/08* (2013.01); *B65D 2543/0049* (2013.01); *B65D 2543/00537* (2013.01)

(58) Field of Classification Search
CPC .......... A47J 47/005; A47J 37/01; A47J 47/10; B65D 41/56; B65D 43/00; B65D 81/36; B65D 43/02; B65D 25/28; B65D 51/28; B65D 47/08; B65D 43/0012; B65D 5343/00694; B65D 2543/00703; B65D 2543/00805; B65D 2543/00814; B65D 21/0228; B65D 11/00; B65D 13/00; B65D 25/00; B65D 2251/08; B65D 2251/1008; B65D 2251/1016; B01D 2313/02; B01D 63/082
USPC ............ 99/446, 422, 449, 646, 425; 217/56; 229/149, 903; 206/508; 493/908; 269/13; 220/212, 784, 671, 315, 324, 220/676, 669, 799, 786, 794, 802, 203.02, 220/305, 281, 793, 912, 212.5, 796, 805, 220/574, 632, 307, 216, 780, 788, 787, 220/789, 791–2, 4.24, 565, 570, 545
See application file for complete search history.

(56) References Cited

U.S. PATENT DOCUMENTS 5,366,208 A * 11/1994 Benjamin ............. A47J 47/005
                                                          269/13
5,390,847 A *  2/1995 Young .................. B65D 5/0075
                                                          229/122.21

(Continued)

*Primary Examiner* — J. Gregory Pickett
*Assistant Examiner* — Tia Cox

(57) ABSTRACT

A cutting board and container allows a user to reduce food into smaller pieces on a cutting surface and immediately transfer the food pieces into a food container. The food container includes container rim, a first retention extrusion, and a second retention extrusion. The cutting surface includes a first board-retention hole and a second board-retention hole. The first retention extrusion is slotted into first board-retention hole and the second retention extrusion is slotted into second board-retention hole to secure the cutting surface onto the food container. The cutting surface includes a food brink to allow the user to directly deposit food pieces from the cutting surface through a food receiving opening of the food container and into the food container.

15 Claims, 12 Drawing Sheets

(56) References Cited

U.S. PATENT DOCUMENTS

| | | | |
|---|---|---|---|
| 2009/0218742 A1* | 9/2009 | Shew | A47J 47/005 269/16 |
| 2012/0074142 A1* | 3/2012 | Mays | A47K 10/421 220/254.1 |
| 2014/0225320 A1* | 8/2014 | Gotsis | A47J 47/005 269/14 |
| 2016/0068325 A1* | 3/2016 | Prommel | B65D 81/36 206/771 |

* cited by examiner

US 10,472,143 B2

CUTTING BOARD AND CONTAINER

The current application claims a priority to the U.S. Provisional Patent application Ser. No. 62/404,700 filed on Oct. 5, 2016.

FIELD OF THE INVENTION

The present invention relates generally to an apparatus for cutting and containing food. More specifically, the present invention is a cutting surface and food container where the food container supports the cutting surface. The present invention allows food to be easily transferred from the cutting surface and into the food container without moving the cutting surface or food container.

BACKGROUND OF THE INVENTION

Common practice in food preparation requires cutting, chopping, dicing, or slicing of fruits, vegetables, cheeses, and meats. These food pieces are typically produced on a cutting surface, such as a cutting board. Once the food pieces have been created the food preparer transfers the food pieces in a mixing or cooking container to be utilized in a dish to be served to whomever that will consume the food. When a plurality of foods is utilized, a cutting board is typically lifted for each food to be transferred into the appropriate container for the next step in food preparation. Constantly moving the cutting board increases the possibility for contaminating the cutting board.

The present invention is a cutting surface and container that allows the transfer of food pieces directly from the cutting surface to the container. The cutting surface is secured to the container to provide a surface to cut food and allow the food preparer to scrape the food pieces into the container without removing the cutting surface from the container. The cutting surface can be removed by the food preparer to cover the container with a covering lid to keep the contents of the container fresh and protected from the environment. The cutting surface may then be placed on the covering lid and engage the container to conveniently store the cutting surface with the container and covering lid.

DETAIL DESCRIPTIONS OF THE INVENTION

All illustrations of the drawings are for the purpose of describing selected versions of the present invention and are not intended to limit the scope of the present invention.

The present invention is a cutting board and container. The present invention allows a user to conveniently prepare and contain food throughout food preparation. The present invention limits the distance necessary for transporting food pieces produced on the cutting board into the container. Therefore, the present invention helps to keep the food pieces free from contamination as opposed to transporting the food pieces from traditional cutting boards to food containers.

Figure 1:
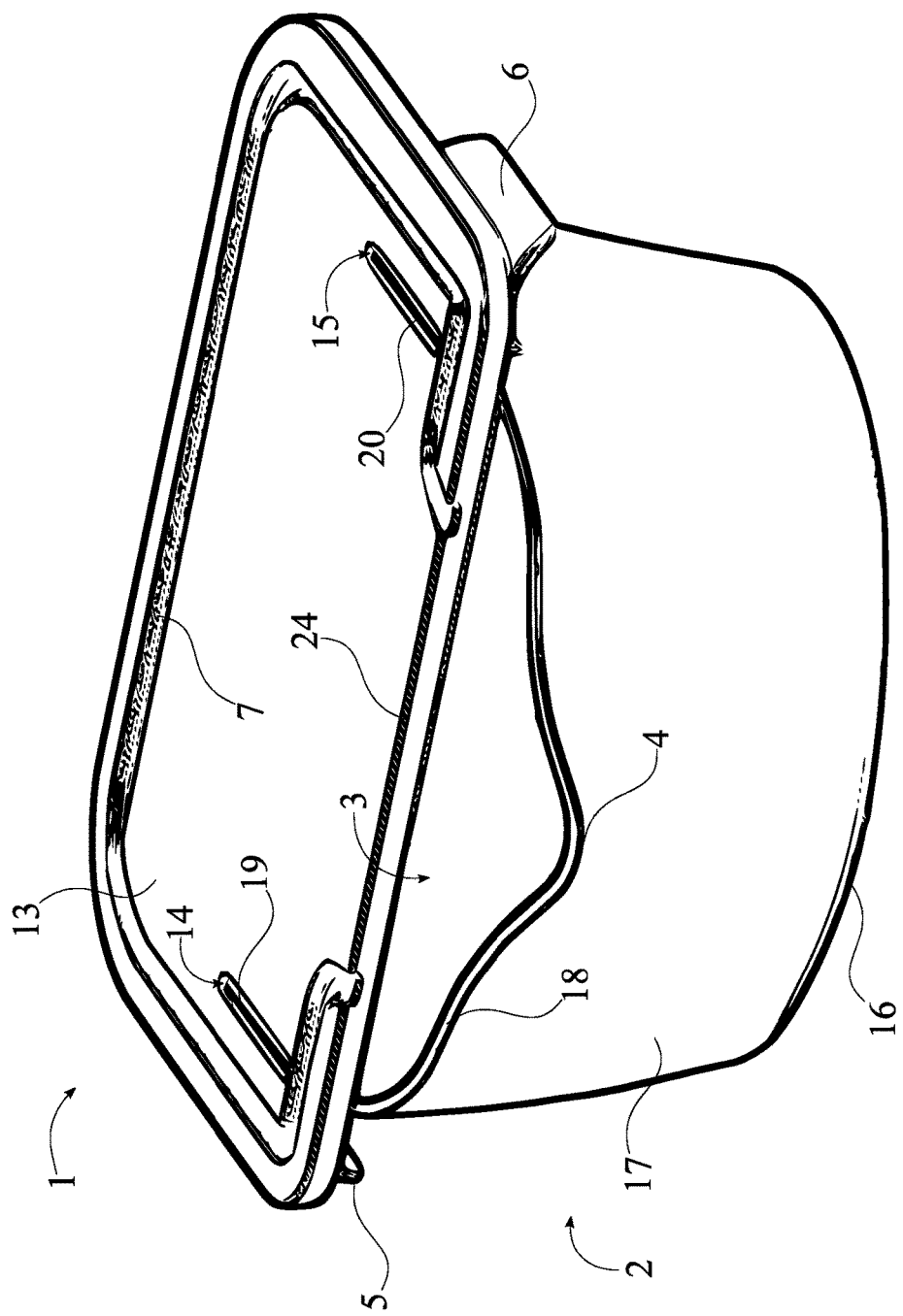
FIG. 1 is a top perspective view of the present invention.
Figure 2:
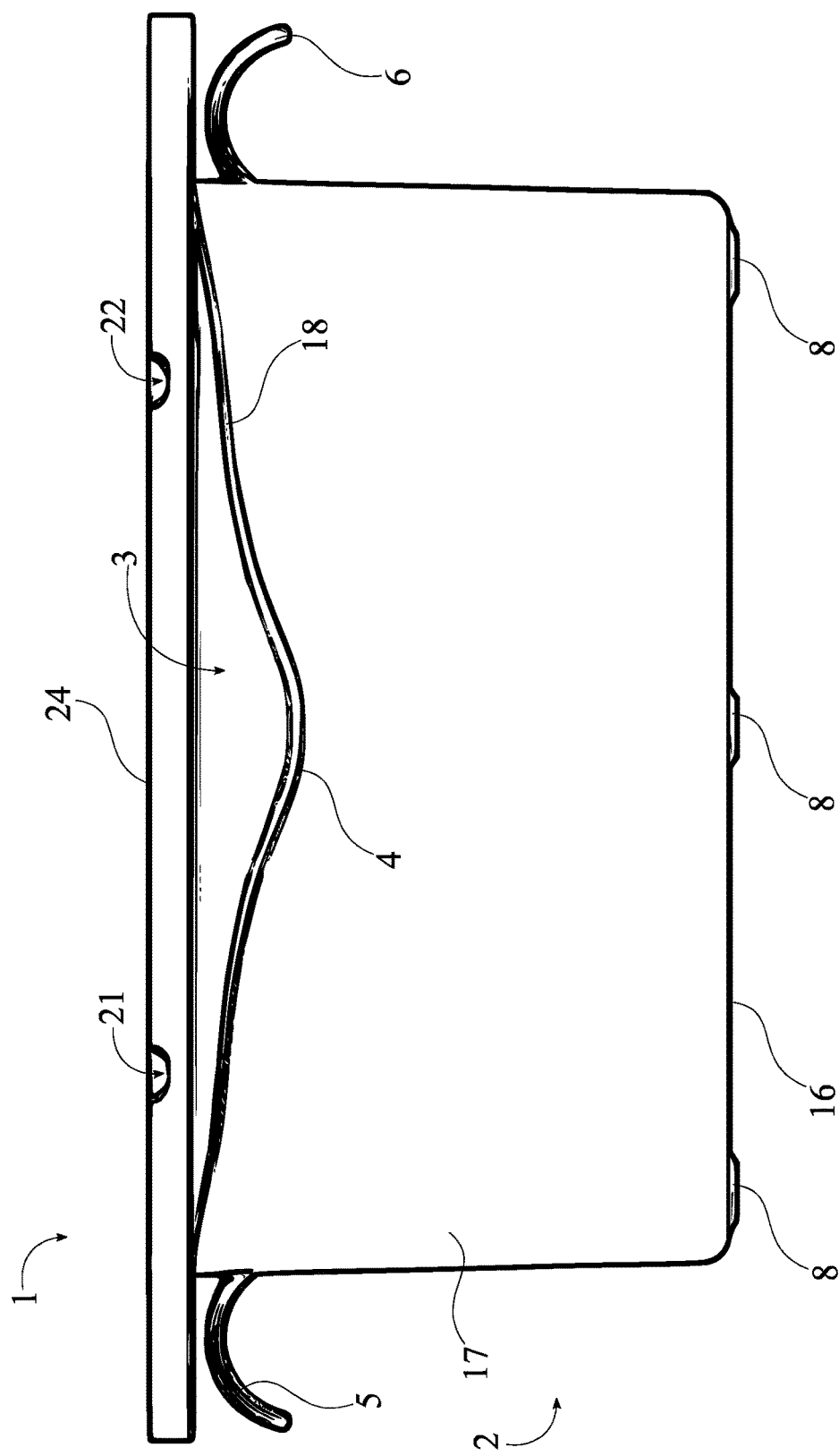
FIG. 2 is a front view of the present invention.
Figure 3:
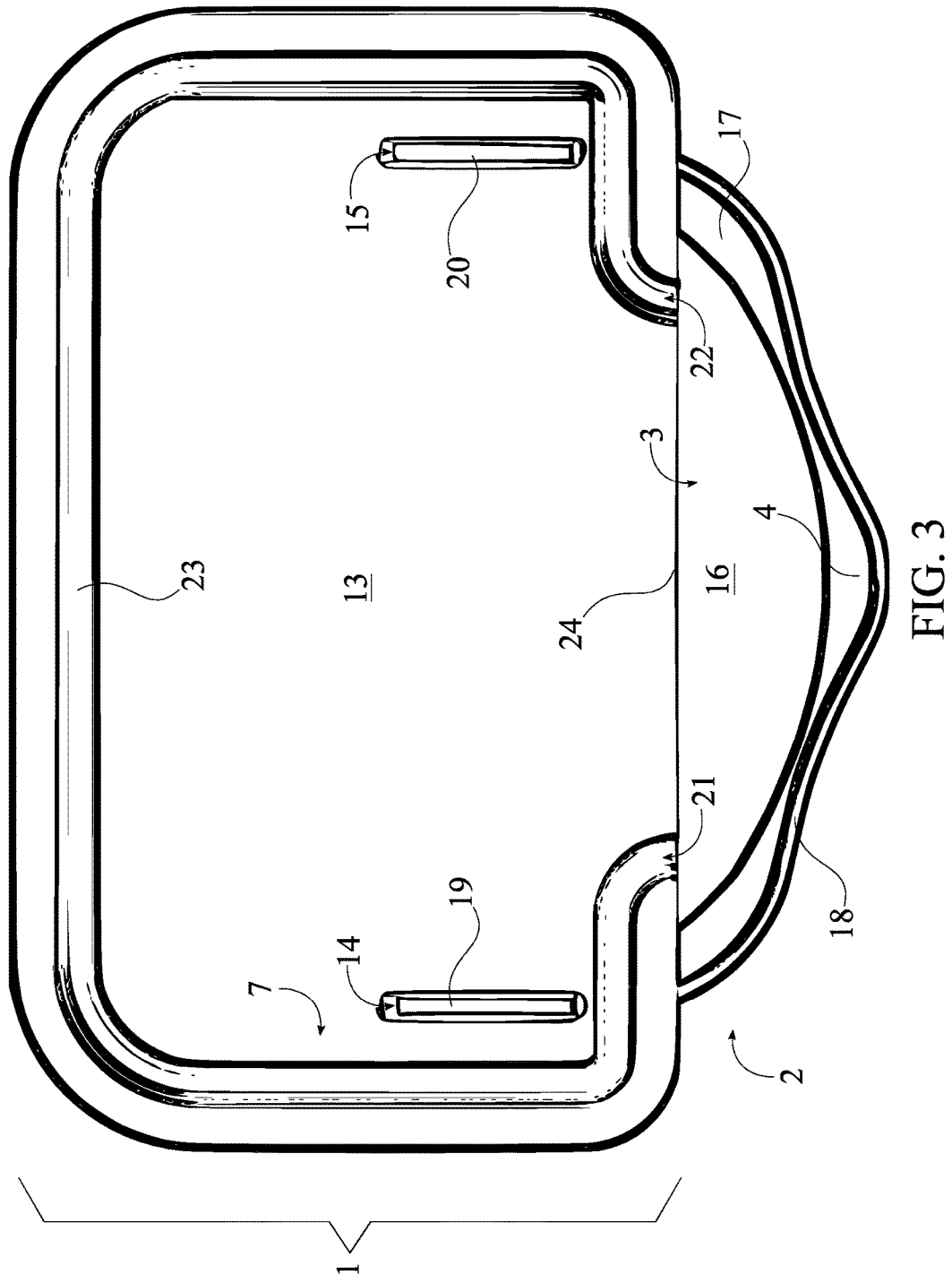
FIG. 3 is a top view of the present invention.
Figure 4:
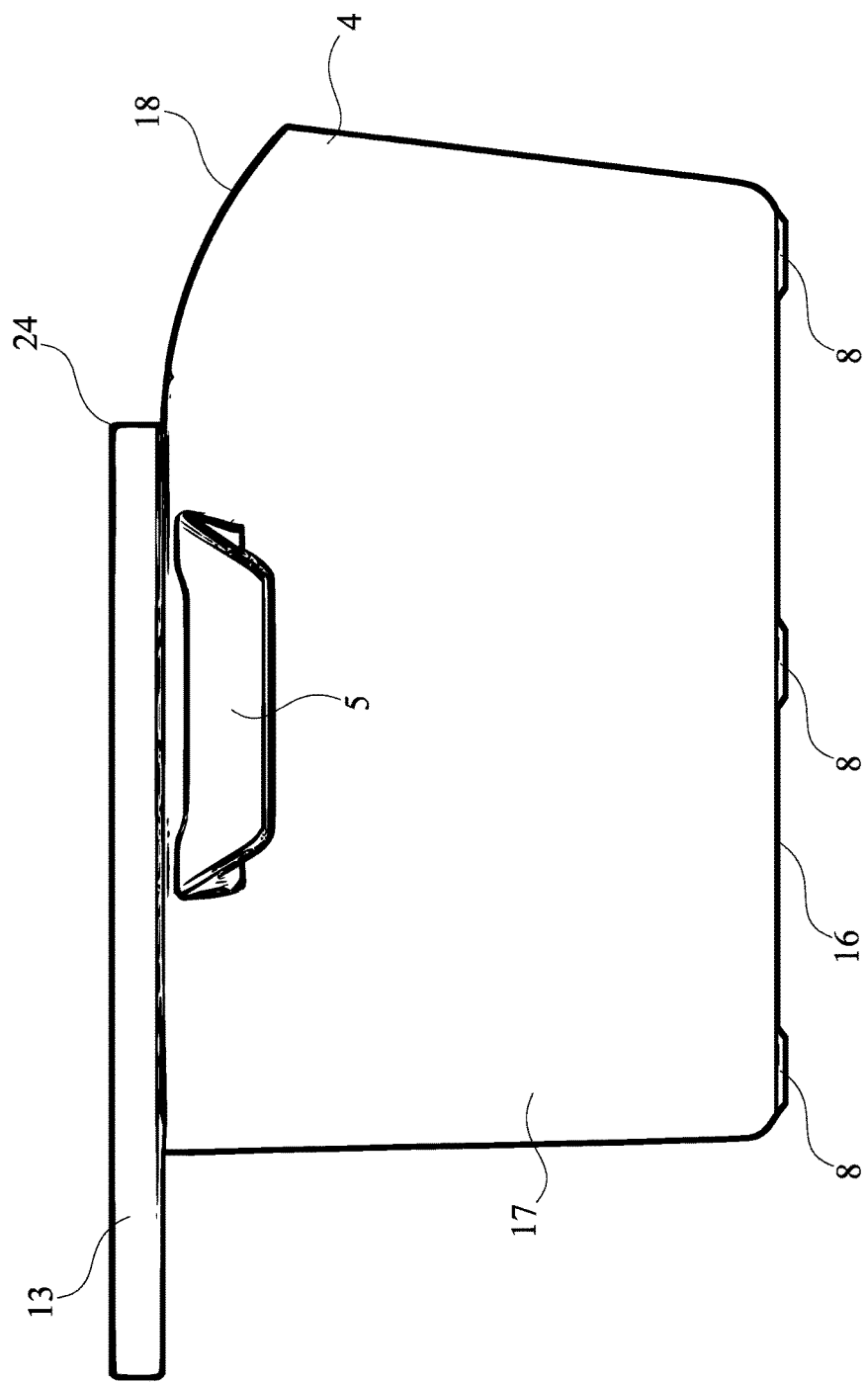
FIG. 4 is a left view of the present invention.
Figure 5:
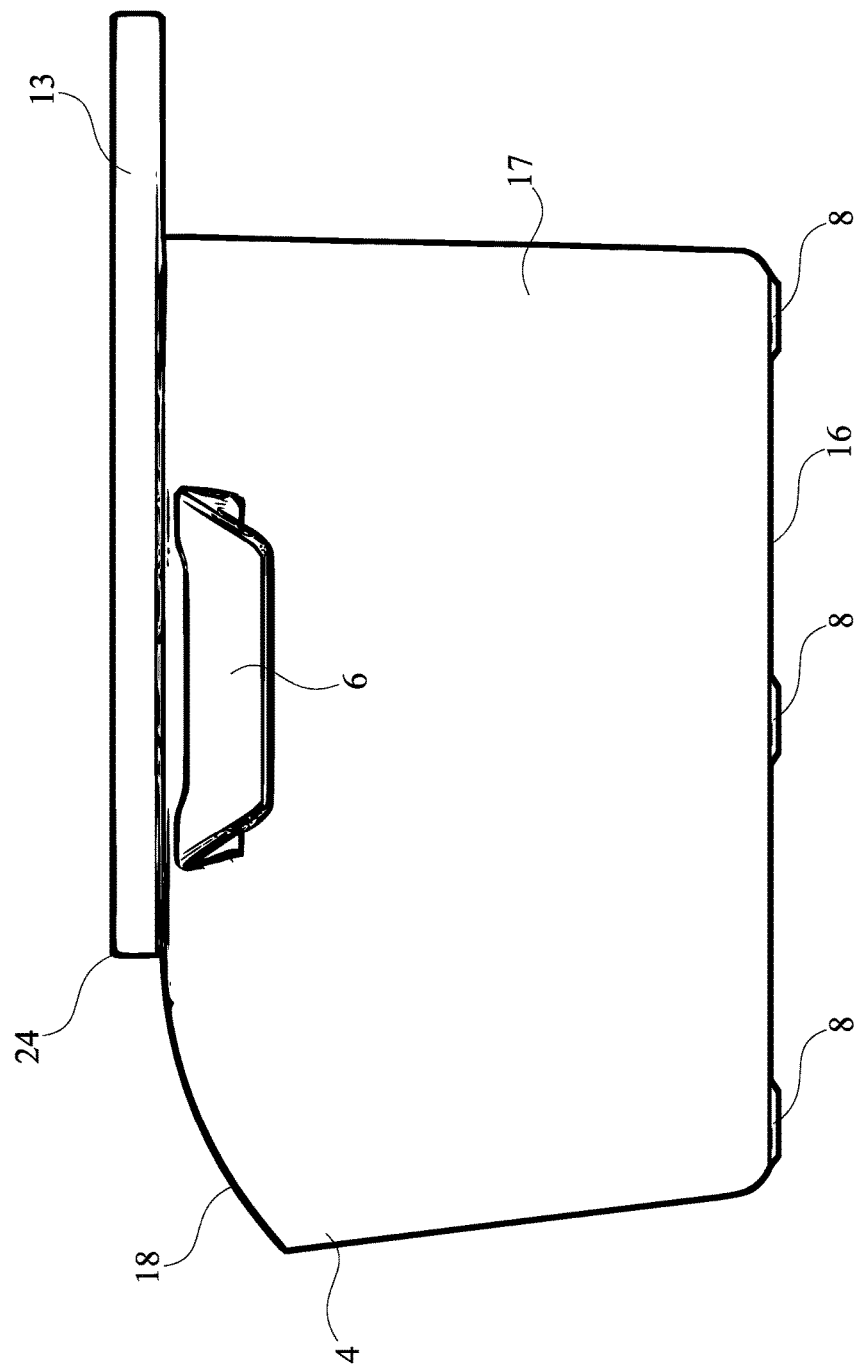
FIG. 5 is a right view of the present invention.

In accordance to FIG. 1 to FIG. 5, the present invention comprises a cutting surface 1 and a food container 2. The cutting surface 1 provides a surface on which the user can cut, dice, mince, chop or slice food into smaller food pieces. The food container 2 is a vessel to receive food and food pieces to serve, prepare, or store the food and food pieces. The cutting surface 1 comprises a board body 13, a first board-retention hole 14, and a second board-retention hole 15, as shown in FIG. 1 and FIG. 3. The board body 13 supports food to allow the user to cut, dice, mince, chop, slice, or otherwise reduce the food into smaller pieces. The first board-retention hole 14 and the second board-retention hole 15 prevent the cutting surface 1 from sliding on the food container 2. The first board-retention hole 14 traverses through the board body 13. Similarly, the second board-retention hole 15 traverses through the board body 13. The first board-retention hole 14 is oppositely positioned to the second board-retention hole 15 across the board body 13. This configuration allows the cutting surface 1 to be secured to the food container 2 through the first board-retention hole 14 and the second board-retention hole 15 and distribute the force evenly to the board body 13 adjacent to the first board-retention hole 14 and the second board-retention hole 15.

Figure 6:
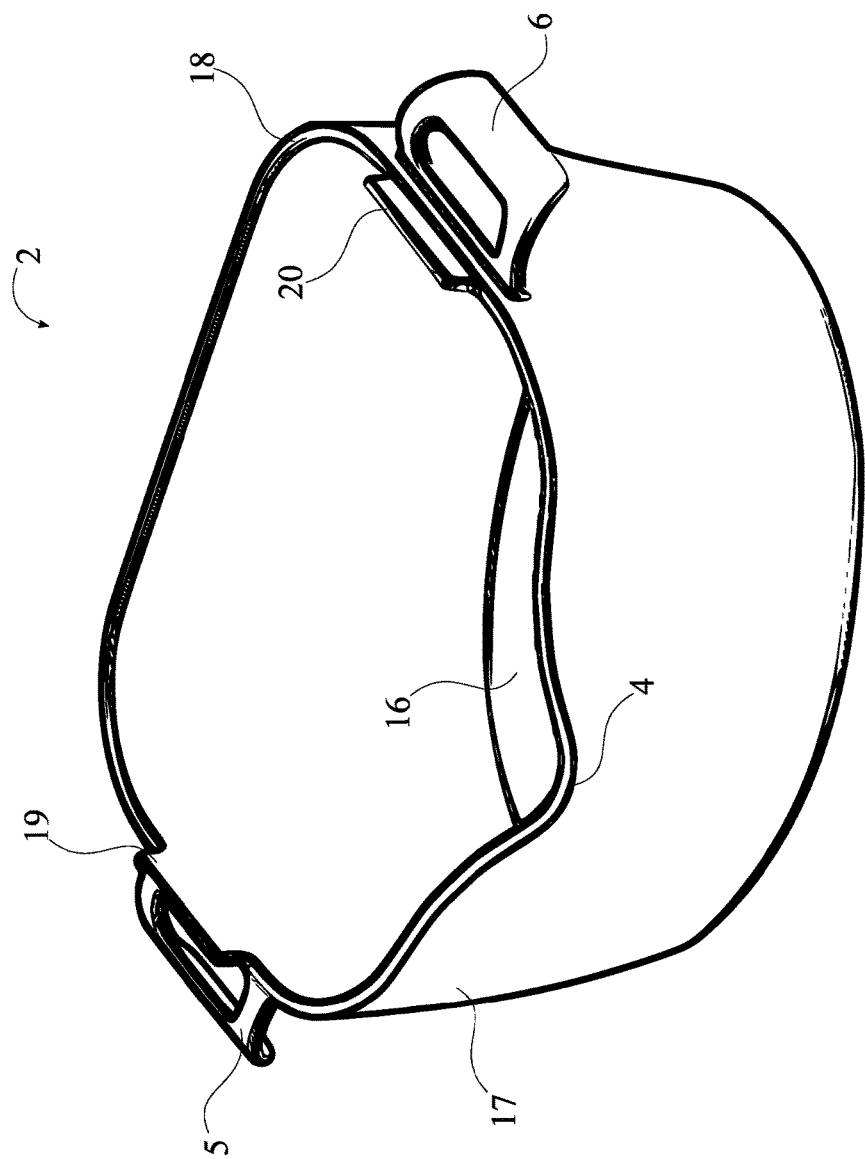
FIG. 6 is a top perspective view of the food container of the present invention.
Figure 9:
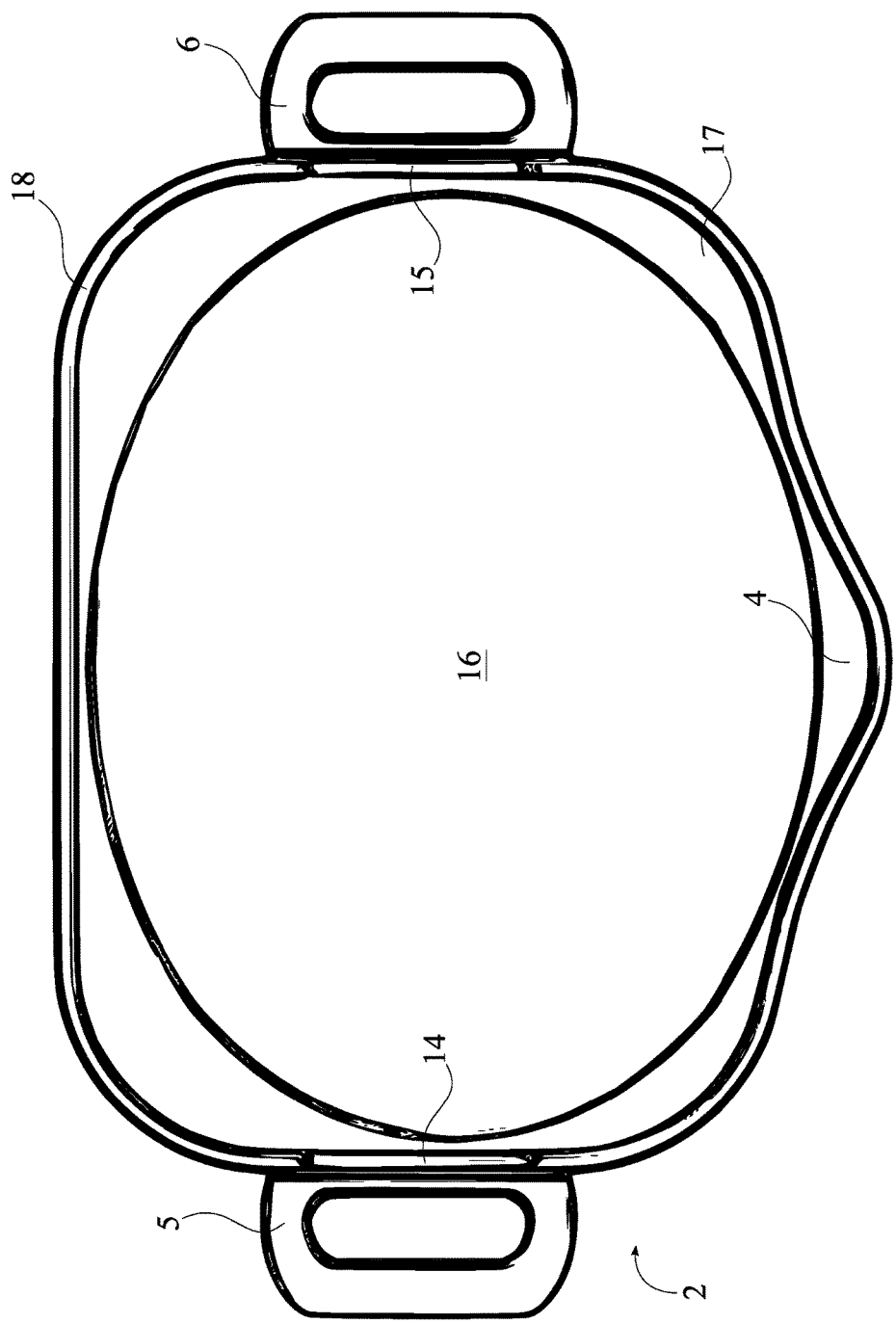
FIG. 9 is a top view of the food container of the present invention.

As detailed in FIG. 6, the food container 2 comprises a container base 16, a lateral wall 17, a container rim 18, a first retention extrusion 19, and a second retention extrusion 20. The container base 16 and the lateral wall 17 define a containment volume to allow the user to mix or store food within the food container 2. The lateral wall 17 is perimetrically connected to the container base 16, shown in FIG. 9. The container rim 18 defines an opening to receive food. The container rim 18 is perimetrically connected to the lateral wall 17, opposite to the container base 16. The first retention extrusion 19 and the second retention extrusion 20 prevent the board body 13 from sliding across the container rim 18. The first retention extrusion 19 is adjacently connected to the container rim 18, opposite to the lateral wall 17. Similarly, the second retention extrusion 20 is adjacently connected to the container rim 18, opposite to the lateral wall 17. The first retention extrusion 19 is oppositely positioned to the second retention extrusion 20 about the container rim 18. The first retention extrusion 19 is slotted into the first board-retention hole 14. Similarly, the second retention extrusion 20 is slotted into the second board-retention hole 15. Thus, this configuration allows the first retention extrusion 19 and the second retention extrusion 20 to distribute forces applied to the cutting surface 1 evenly to the food container 2.

In accordance to the preferred embodiment of the present invention, the board body 13 comprises a food brink 24, as shown in FIG. 1 to FIG. 5. The food brink 24 is an edge of the board body 13 over which food is intended to traverse from the cutting surface 1 and into the food container 2. The first board-retention hole 14 and the second board-retention hole 15 are adjacent to the food brink 24. Therefore, the food brink 24 and the container rim 18 delineate a food receiving opening 3 for food to be directly received from the cutting surface 1 when the first retention extrusion 19 is slotted into the first board-retention hole 14 and the second retention extrusion 20 is slotted into the second board-retention hole 15.

Further in accordance to the preferred embodiment of the present invention, the present invention comprises a pour spout 4, shown in FIG. 1 to FIG. 6 and FIG. 9 to FIG. 11. The pour spout 4 allows the user to decant the contents of the food container 2 into another vessel. The pour spout 4 is laterally integrated into the lateral wall 17, adjacent to the container rim 18. The pour spout 4 is offset from the first retention extrusion 19 and the second retention extrusion 20. The pour spout 4 is preferred to be oppositely positioned to the food brink 24 about the food receiving opening 3 when the cutting surface 1 is placed onto the container rim 18 in order to allow the user to drain the contents of the food container 2 without removing the cutting surface 1.

Figure 10:
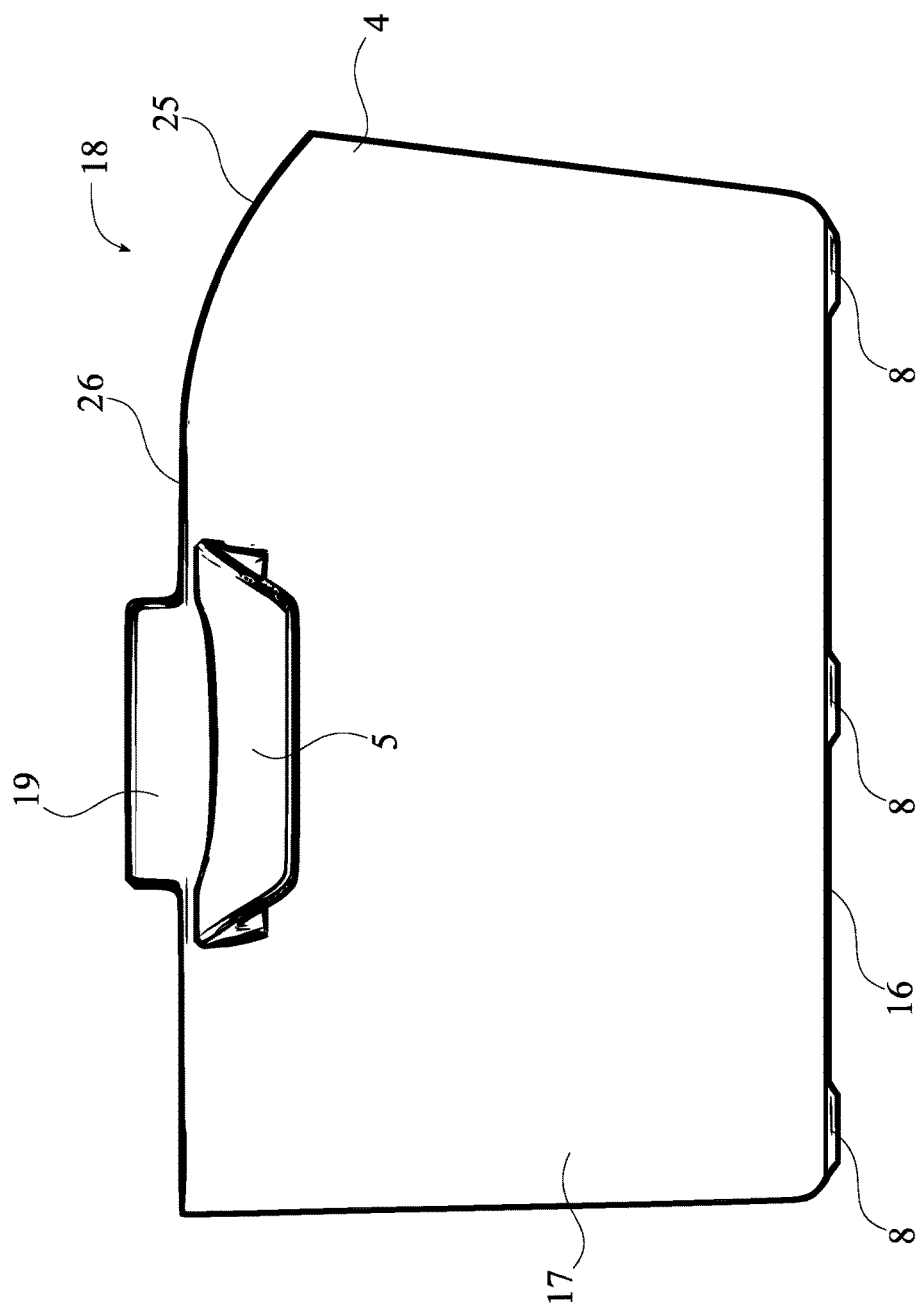
FIG. 10 is a left view of the food container of the present invention.
Figure 11:
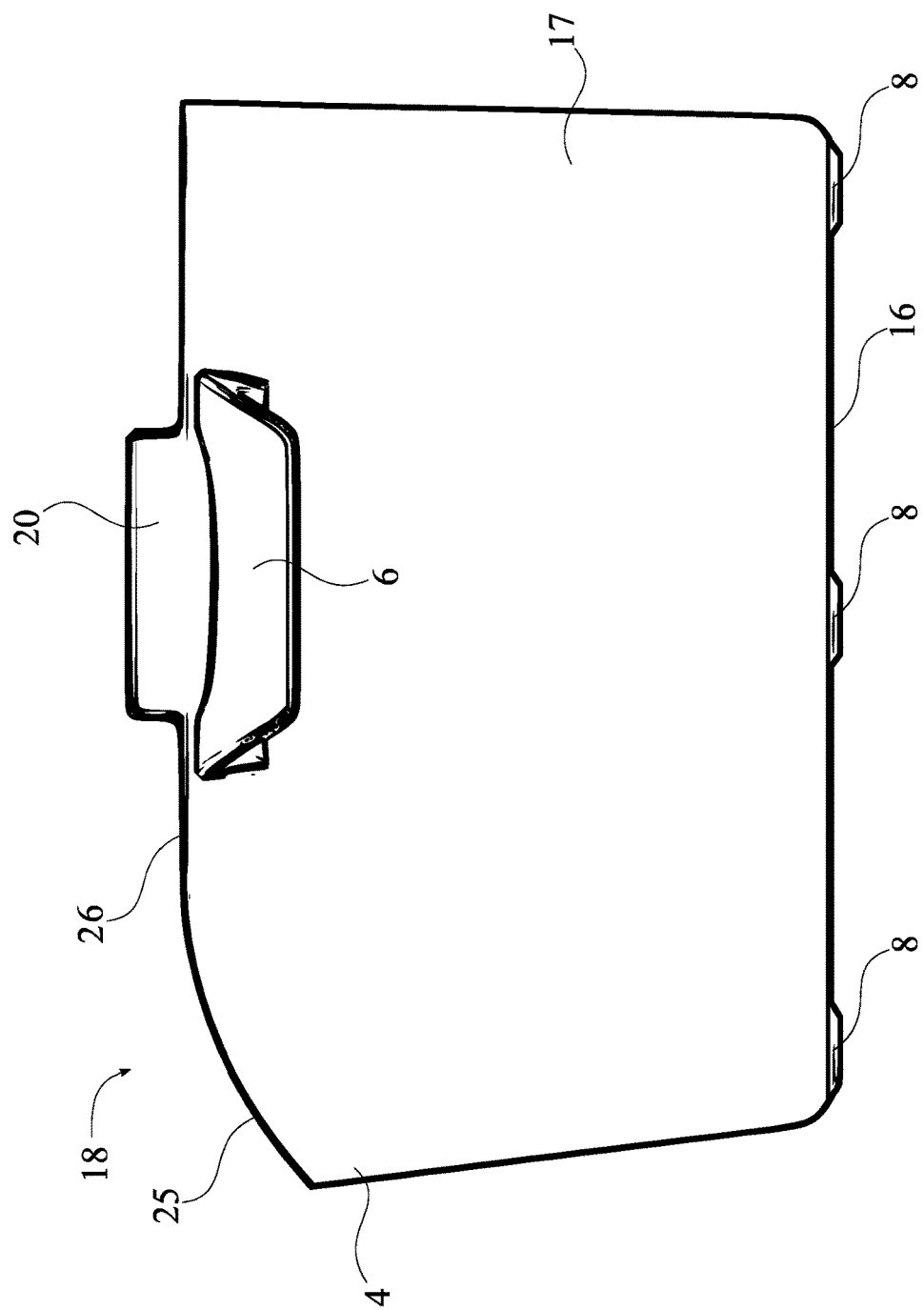
FIG. 11 is a right view of the food container of the present invention.

For a more specific embodiment of the present invention, the container rim comprises a board-interfacing portion 26 and a spout portion 25, in accordance to FIG. 10 and FIG. 11. The board-interfacing portion 26 supports the cutting surface 1. The pour spout 4 is integrated with the spout portion 25. The spout portion 25 is angularly offset from the board-interfacing portion 26 towards the container base 16, detailed in FIG. 10 and FIG. 11. This configuration limits unintentional contact between the user and the pour spout 4 that might tip, slide, or otherwise move the food container 2 during implementation of the present invention as the pour spout 4 is offset towards the container base 16 from the cutting surface 1, when the cutting surface 1 is positioned on the food container 2.

The present invention preferably comprises a first handle 5 and a second handle 6, exemplified in FIG. 2, FIG. 6 to FIG. 9 and FIG. 12. The first handle 5 and the second handle 6 allow the user to lift the present invention for the transference, transportation, or storage of any contents within the food container 2. The first handle 5 is adjacently and externally connected to the lateral wall 17. The first handle 5 is preferred to be adjacently positioned to the first retention extrusion 19. Similarly, the second handle 6 is adjacently and externally connected to the lateral wall 17. The second handle 6 is preferred to be adjacently positioned to the second retention extrusion 20. The first handle 5 is oppositely positioned to the second handle 6 about the lateral wall 17. This configuration allows the user to evenly distribute the weight of the present invention between the first handle 5 and the second handle 6 as the present invention is lifted.

Still in accordance to the preferred embodiment of the present invention, the present invention comprises a fluid drainage channel 7, detailed in FIG. 1 and FIG. 3. The fluid drainage channel 7 prevents any fluid produced by reducing food into smaller pieces on the cutting surface 1 from accumulating on and spilling over the cutting surface 1 outside of the food container 2. The fluid drainage channel 7 is externally integrated with the board body 13. The fluid drainage channel 7 is oppositely positioned to the container rim 18 about the board body 13, when the first retention extrusion 19 is slotted into the first board-retention hole 14 and the second retention extrusion 20 is slotted into the second board-retention hole 15.

In accordance to FIG. 3, the fluid drainage channel 7 comprises a first drainage end 21, a second drainage end 22, and a main channel 23. The main channel 23 is a containment channel for any fluid produced by reducing food into smaller pieces on the cutting surface 1. The first drainage end 21 and the second drainage end 22 are outlets that allow fluid to drain from the main channel 23 and into the food container 2. The main channel 23 is perimetrically positioned about the board body 13 in order to prevent fluids from spilling outside of the present invention. The first drainage end 21 traverses through the food brink 24. Similarly, the second drainage end 22 traverses through the food brink 24. The first drainage end 21 and the second drainage end 22 are oppositely positioned to each other along the main channel 23 to allow fluid from the main channel 23 to drain from two sides into the food container 2.

Figure 7:
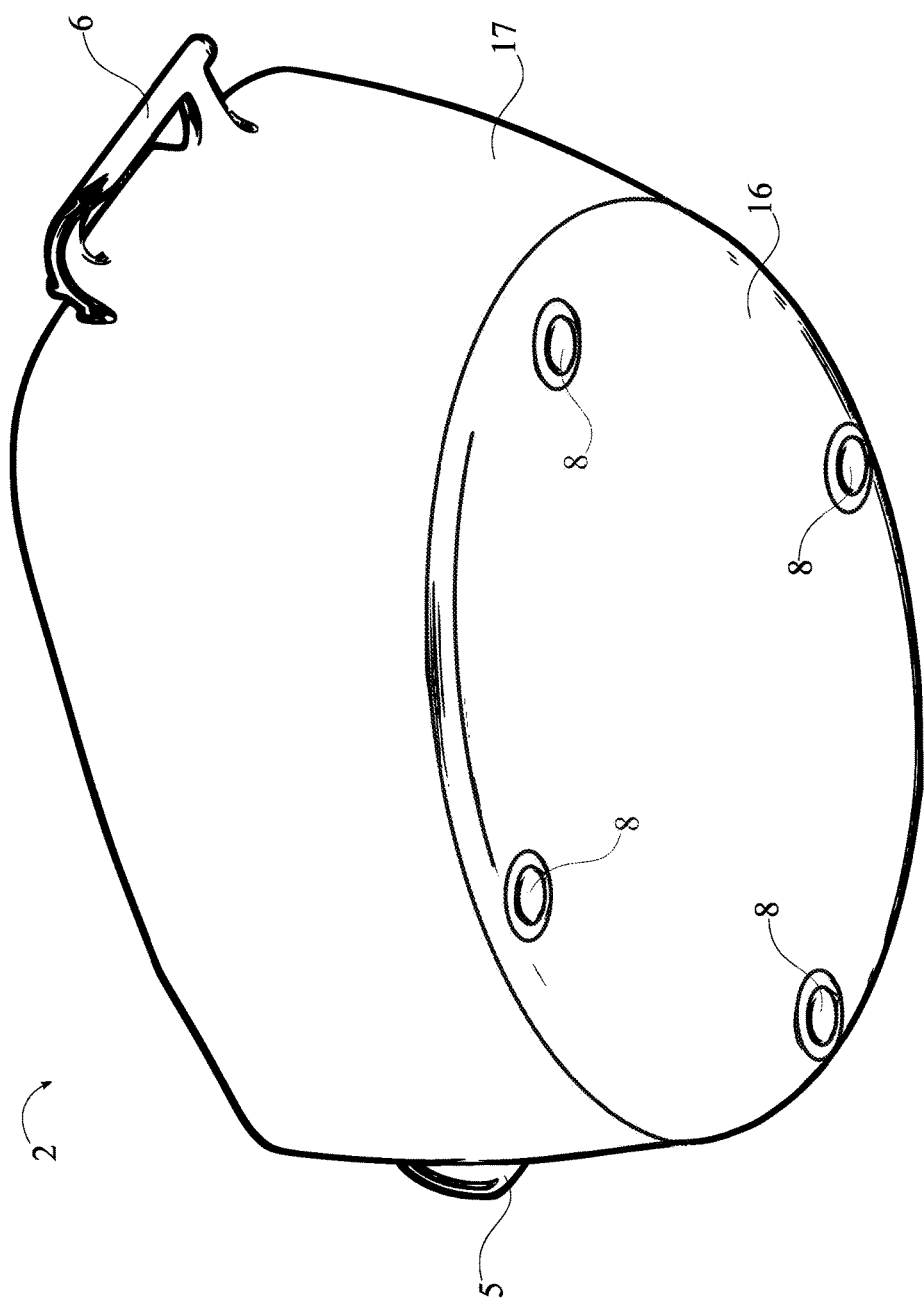
FIG. 7 is a bottom perspective view of the food container of the present invention, wherein the present invention comprises a plurality of gripping feet.

In some embodiments of the present invention, the present invention comprises a plurality of gripping feet 8, shown in FIG. 7. The plurality of gripping feet 8 offsets the food container 2 from a supporting surface that the present invention rests on during implementation of the present invention, as well as reducing the tendency for the present invention to slide on the supporting surface. The plurality of gripping feet 8 is adjacently connected to the container base 16. The plurality of gripping feet 8 is oppositely positioned to the lateral wall 17 about the container base 16 such that the plurality of gripping feet 8 interfaces with the supporting surface when the present invention is implemented. The plurality of gripping feet 8 is preferred to be evenly distributed about the container base 16 to effectively distribute the weight of the present invention on the supporting surface.

Figure 8:
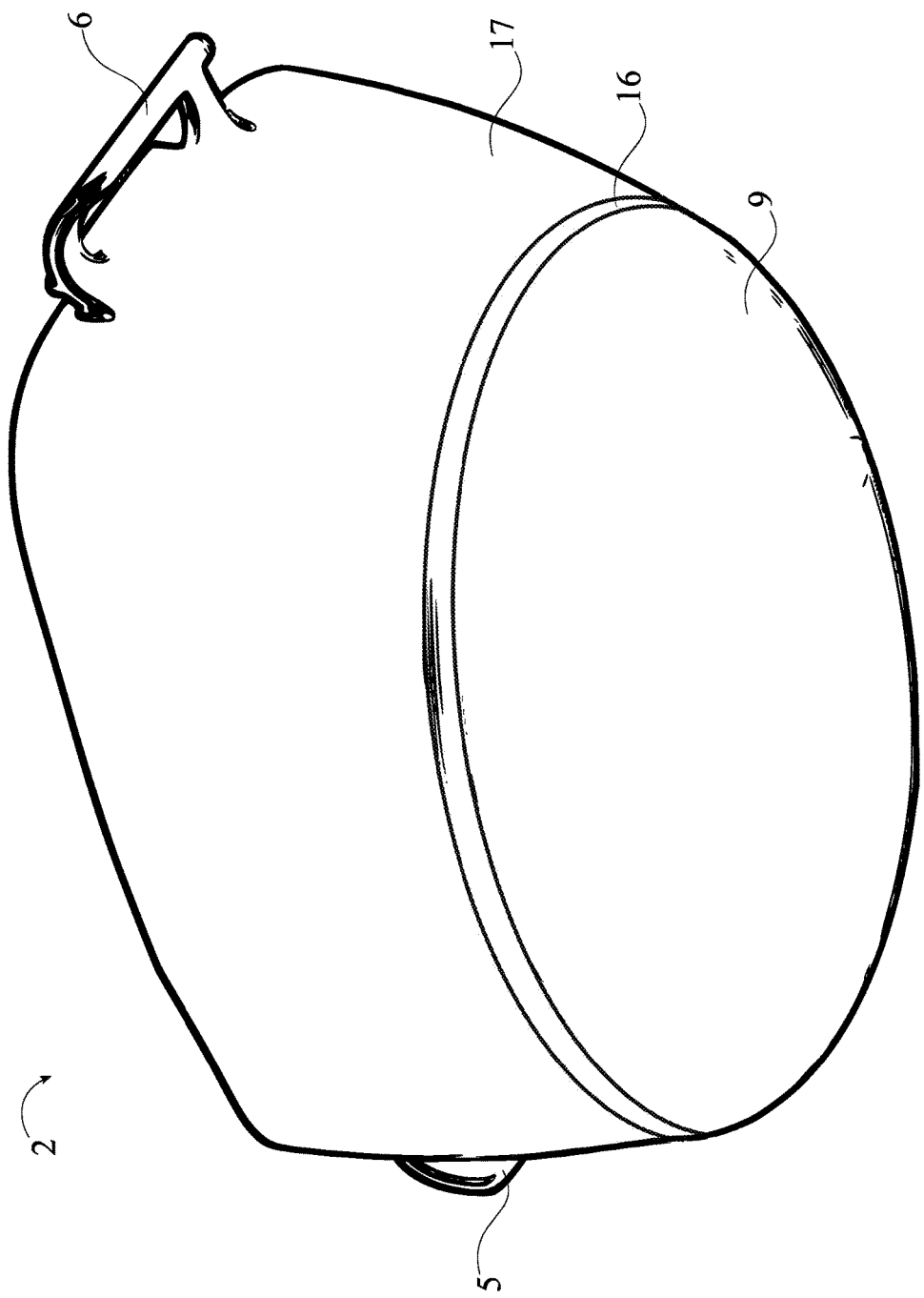
FIG. 8 is a bottom perspective view of the food container of the present invention, wherein the present invention comprises a non-slip layer.

In accordance to an alternate embodiment of the present invention, the present invention comprises a non-slip layer 9, shown in FIG. 8. The non-slip layer 9 prevents the present invention from slipping on the supporting surface. The non-slip layer 9 is adjacently connected to the container base 16. The non-slip layer 9 is oppositely positioned to the lateral wall 17 about the container base 16 such that non-slip layer 9 interfaces with the supporting surface when the present invention is implemented.

Figure 12:
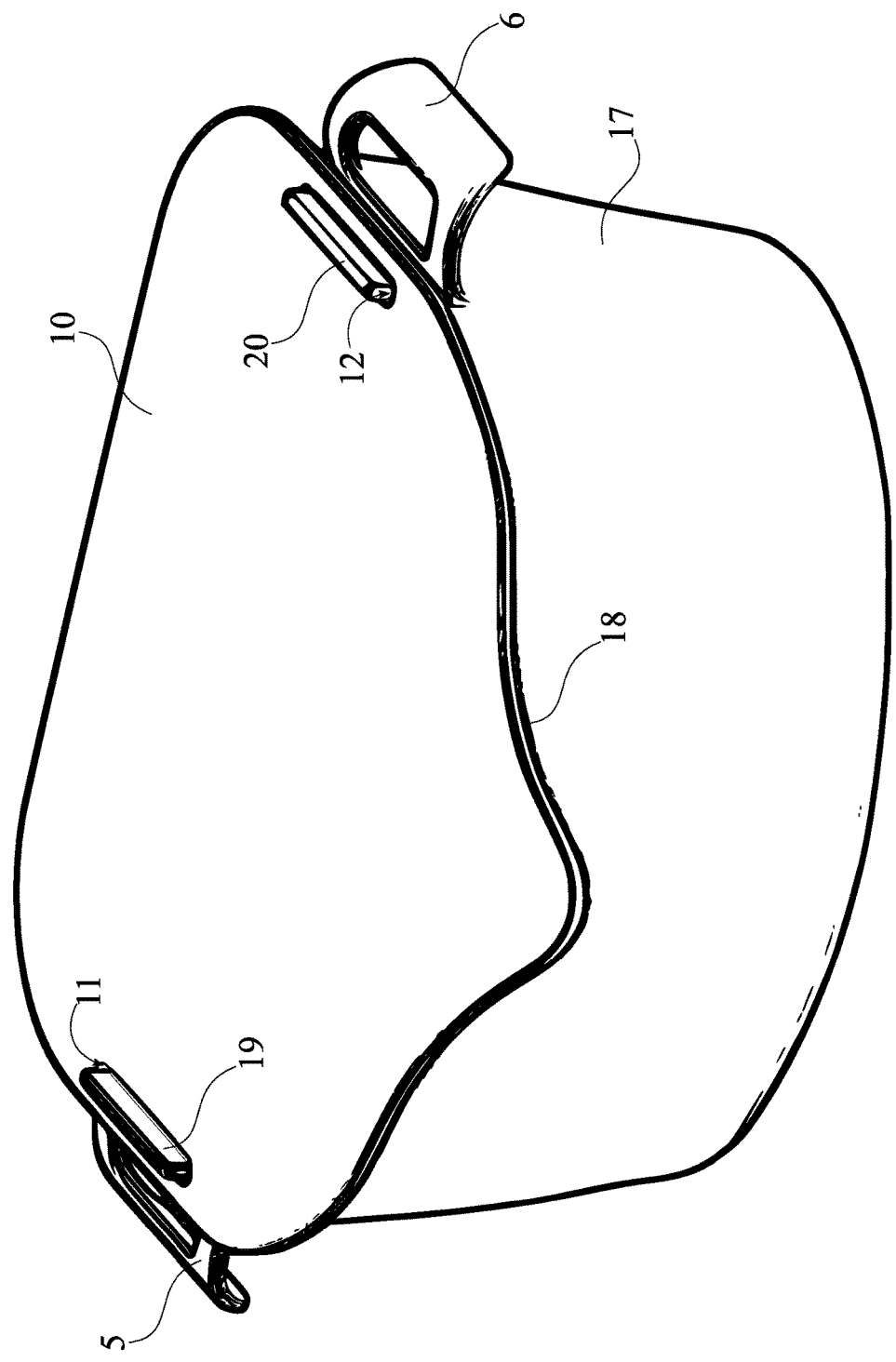
FIG. 12 is a top perspective view of the present invention, wherein a covering lid engages the container rim.

Further in accordance to the preferred embodiment of the present invention, the present invention comprises a covering lid 10, a first lid-retention hole 11, and a second lid-retention hole 12, detailed in FIG. 12. The covering lid 10 encloses the food container 2 to prevent the contents of the food container 2 from being contaminated or dislodged from the food container 2. The first lid-retention hole 11 and the second lid-retention hole 12 allow the covering lid 10 to be secured to the first retention extrusion 19 and the second retention extrusion 20. The first lid-retention hole 11 traverses through the covering lid 10. Similarly, second lid-retention hole 12 traverses through the covering lid 10. The first lid-retention hole 11 is oppositely positioned to the second lid-retention hole 12 along the covering lid 10 in order to align with the first retention extrusion 19 and the second retention extrusion 20, respectively. The first retention extrusion 19 is slotted into the first lid-retention hole 11. The second retention extrusion 20 is slotted into the second lid-retention hole 12. The covering lid 10 perimetrically engages the container rim 18. This configuration allows the covering lid 10 to be secured to the container rim 18. More specifically, the first retention extrusion 19 and the second retention extrusion 20 extrude through the covering lid 10 to allow the first retention extrusion 19 to be slotted into the first board-retention hole 14 and the second retention extrusion 20 to be slotted into the second board-retention hole 15. Thus, the cutting surface 1 is able to be stored with the food container 2 while the covering lid 10 engages the food container 2.

Although the invention has been explained in relation to its preferred embodiment, it is to be understood that many other possible modifications and variations can be made without departing from the spirit and scope of the invention as hereinafter claimed.

What is claimed is:

1. A cutting board and container system comprising:
a cutting board;
a food container;
the cutting board being configured to be positioned on the food container;
the cutting board comprising a board body, a first board-retention hole and a second board-retention hole;
the food container comprising a container base, a lateral wall, a container rim, a first retention extrusion and a second retention extrusion;
the first board-retention hole traversing through the board body;
the second board-retention hole traversing through the board body;
the first board-retention hole being oppositely located to the second board-retention hole across the board body;
the lateral wall being perimetrically connected to the container base;
the container rim being perimetrically connected to the lateral wall;
the container rim being oppositely located to the container base;
the first retention extrusion being connected to the container rim;
the first retention extrusion being oppositely located to the lateral wall;
the second retention extrusion being connected to the container rim;
the second retention extrusion being oppositely located to the lateral wall;
the first retention extrusion being oppositely located to the second retention extrusion about the container rim;
in response to the cutting board being positioned on the food container, the first retention extrusion being slotted into the first board-retention hole without protruding from the board body, and the second retention extrusion being slotted into the second board-retention hole without protruding from the board body; and
in response to the cutting board being positioned on the food container, a portion of the board body being supported on the container rim, and a remaining portion of the board body being cantilevered outward from the container rim.

2. The cutting board and container system, as claimed in claim 1, comprising;
the cutting board comprising a food brink; and
the first board-retention hole and the second board-retention hole each being adjacently located to the food brink.

3. The cutting board and container system, as claimed in claim 1, comprising;
the cutting board comprising a food brink; and
in response to the cutting board being positioned on the food container, the food brink and the container rim delineating a food receiving opening.

4. The cutting board and container system, as claimed in claim 3, comprising;
the food container comprising a pour spout;
the pour spout being laterally integrated into the lateral wall;
the pour spout being adjacently located to the container rim;
the pour spout being offset from the first retention extrusion and the second retention extrusion; and
in response to the cutting board being positioned on the food container, the pour spout being oppositely located to the food brink about the food receiving opening.

5. The cutting board and container system, as claimed in claim 1, comprising;
the food container comprising a pour spout;
the pour spout being laterally integrated into the lateral wall;
the pour spout being adjacently located to the container rim; and
the pour spout being offset from the first retention extrusion and the second retention extrusion.

6. The cutting board and container system, as claimed in claim 5, comprising;
the container rim comprising a board-interfacing portion and a spout portion;
the pour spout being integrated with the spout portion; and
the spout portion being angularly offset from the board-interfacing portion towards the container base.

7. The cutting board and container system, as claimed in claim 1, comprising;
the food container comprising a first handle and a second handle;
the first handle being externally connected to the lateral wall;
the second handle being externally connected to the lateral wall; and
the first handle being oppositely located to the second handle about the lateral wall.

8. The cutting board and container system, as claimed in claim 7, comprising;
the first handle being adjacently located to the first retention extrusion; and
the second handle being adjacently located to the second retention extrusion.

9. The cutting board and container system, as claimed in claim 1, comprising;
the cutting board comprising a fluid drainage channel;
the fluid drainage channel traversing into the board body; and
the fluid drainage channel being integrated with the board body.

10. The cutting board and container system, as claimed in claim 9, comprising;
in response to the cutting board being positioned on the food container, the fluid drainage channel being oppositely positioned to the container rim about the board body.

11. The cutting board and container system, as claimed in claim 9, comprising;
the cutting board comprising a board edge and a food brink;
the board edge being perimetrically formed on the board body;
the food brink being formed on the board edge;
the fluid drainage channel comprising a first drainage end, a second drainage end and a main channel;
the main channel being perimetrically positioned about the board body;
the main channel extending along the board edge;
the main channel being offset from the board edge;

the main channel being in communication in between the first drainage end and the second drainage end;

the first drainage end and the second drainage end being oppositely positioned to each other along the main channel;

the first drainage end traversing through the board edge;

the second drainage end traversing through the board edge; and the food brink being located in between the first drainage end and the second drainage end.

12. The cutting board and container system, as claimed in claim 1, comprising;

the food container comprising a plurality of gripping feet;

the plurality of gripping feet being connected to the container base; and the plurality of gripping feet being oppositely located to the lateral wall about the container base.

13. The cutting board and container system, as claimed in claim 12, comprising;

the plurality of gripping feet being evenly distributed about the container base.

14. The cutting board and container system, as claimed in claim 1, comprising;

the food container comprising a non-slip layer;

the non-slip layer being connected to the container base; and the non-slip layer being oppositely located to the lateral wall about the container base.

15. The cutting board and container system, as claimed in claim 1, comprising;

a covering lid;

the covering lid being configured to be positioned on the food container;

the covering lid comprising a lid body, a first lid-retention hole and a second lid-retention hole;

the first lid-retention hole traversing through the covering lid;

the second lid-retention hole traversing through the covering lid;

the first lid-retention hole being oppositely located to the second lid-retention hole along the covering lid; and in response to the covering lid being positioned on the food container, the first retention extrusion being slotted into the first lid-retention hole and protruding from the lid body, the second retention extrusion being slotted into the second lid-retention hole and protruding from the lid body, and the lid body perimetrically engaging the container rim.

* * * * *